(12) United States Patent
Daga et al.

(10) Patent No.: US 12,555,034 B2
(45) Date of Patent: Feb. 17, 2026

(54) DYNAMIC TOPOLOGY RECONFIGURATION IN FEDERATED LEARNING SYSTEMS

(71) Applicant: Cisco Technology, Inc., San Jose, CA (US)

(72) Inventors: Harshit Daga, Atlanta, GA (US); Myungjin Lee, Bellevue, WA (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 992 days.

(21) Appl. No.: 17/683,886

(22) Filed: Mar. 1, 2022

(65) Prior Publication Data

US 2023/0281502 A1    Sep. 7, 2023

(51) Int. Cl.
*G06N 20/00* (2019.01)
*H04L 41/12* (2022.01)

(52) U.S. Cl.
CPC .............. *G06N 20/00* (2019.01); *H04L 41/12* (2013.01)

(58) Field of Classification Search
None
See application file for complete search history.

(56) References Cited

U.S. PATENT DOCUMENTS

| | | | |
|---|---|---|---|
| 7,103,853 B1* | 9/2006 | Patil | G06F 40/169 715/779 |
| 9,633,315 B2 | 4/2017 | Chapelle et al. | |
| 2002/0118642 A1* | 8/2002 | Lee | H04L 67/568 370/235 |
| 2005/0063321 A1* | 3/2005 | Imai | H04L 41/12 370/256 |
| 2008/0301765 A1* | 12/2008 | Nicol | H04L 63/20 726/1 |

(Continued)

FOREIGN PATENT DOCUMENTS

| | | |
|---|---|---|
| CN | 110728376 | 1/2020 |
| CN | 113010305 | 6/2021 |

OTHER PUBLICATIONS

AbdulRahman et al., "A Survey on Federated Learning: The Journey From Centralized to Distributed On-Site Learning and Beyond," Oct. 2020, https://www.researchgate.net/publication/344871928_A_Survey_on_Federated_Learning_The_Journey_From_Centralized_to_Distributed_On-Site_Learning_and_Beyond.*

(Continued)

*Primary Examiner* — Ryan Barrett
(74) *Attorney, Agent, or Firm* — Lee & Hayes, P.C.

(57) ABSTRACT

In one embodiment, a device provides, to a user interface, data representing a topology of a federated learning system configured across nodes in a computer network. Each node in the topology has an assigned role and is connected to at least one other node via a connector that is dependent on its assigned role. The device receives, via the user interface, a requested change to the topology of the federated learning system. The device selects, based on assigned roles of those nodes affected by the requested change to the topology of the federated learning system, code for execution by those nodes. The device implements the requested change to the topology of the federated learning system in part by sending the code selected by the device to those nodes affected by the requested change.

20 Claims, 8 Drawing Sheets

(56) References Cited

U.S. PATENT DOCUMENTS

| | | | | |
|---|---|---|---|---|
| 2009/0327901 | A1* | 12/2009 | Kapadia | H04J 14/0227 398/83 |
| 2011/0016423 | A1* | 1/2011 | Brubaker | G06F 3/0481 715/788 |
| 2011/0265188 | A1* | 10/2011 | Ramaswamy | G06F 21/31 715/764 |
| 2012/0060207 | A1* | 3/2012 | Mardikar | H04L 63/20 726/4 |
| 2013/0081105 | A1* | 3/2013 | Giambiagi | H04L 63/20 726/1 |
| 2013/0283175 | A1* | 10/2013 | Faridian | H04L 41/00 715/736 |
| 2013/0305091 | A1* | 11/2013 | Stan | H04L 43/50 714/35 |
| 2014/0211657 | A1* | 7/2014 | Balasubramanian | H04L 41/0803 370/254 |
| 2015/0205471 | A1* | 7/2015 | Abrams | G06F 16/24578 715/744 |
| 2016/0197834 | A1* | 7/2016 | Luft | H04L 12/46 709/223 |
| 2017/0093645 | A1* | 3/2017 | Zhong | H04L 43/045 |
| 2017/0230451 | A1* | 8/2017 | Paramasivam | G06F 16/24578 |
| 2019/0190830 | A1* | 6/2019 | Litzinger | H04L 47/11 |
| 2019/0362087 | A1* | 11/2019 | Ferrans | H04L 63/102 |
| 2021/0097439 | A1 | 4/2021 | Vodencarevic et al. | |
| 2021/0142223 | A1 | 5/2021 | Choudhury et al. | |
| 2021/0328893 | A1* | 10/2021 | Cherkas | H04L 67/10 |
| 2022/0150057 | A1* | 5/2022 | Yang | H04L 63/0823 |
| 2022/0245528 | A1* | 8/2022 | Behera | H04L 9/0894 |
| 2023/0081959 | A1* | 3/2023 | Li | H04L 41/122 370/254 |
| 2023/0107301 | A1* | 4/2023 | Moradi | H04L 41/30 706/12 |
| 2023/0169356 | A1* | 6/2023 | Banerjee | G06N 20/20 706/12 |
| 2023/0259812 | A1* | 8/2023 | Jagyasi | G06N 20/00 706/13 |
| 2024/0256890 | A1* | 8/2024 | Lee | G06N 3/098 |
| 2024/0303504 | A1* | 9/2024 | Xu | G06N 3/098 |
| 2025/0036961 | A1* | 1/2025 | Lee | G06V 10/774 |
| 2025/0086473 | A1* | 3/2025 | Tong | G06N 20/00 |
| 2025/0258708 | A1* | 8/2025 | Crabtree | G06F 9/5027 |

OTHER PUBLICATIONS

Behera et al., "Federated Learning using Peer-to-peer Network for Decentralized Orchestration of Model Weights," Oct. 30, 2023, https://doi.org/10.36227/techrxiv.14267468.v1, htps://www.techrxiv.org/doi/full/10.36227/techrxiv.14267468.v1.*

Carter, "RBAC vs ABAC Access Control Models," Aug. 20, 2017, https://web.archive.org/web/20170820153115/https:/blog.identityautomation.com/rbac-vs-abac-access-control-models-iam-explained.*

Ferraiolo et al., "Role-Based Access Controls," Oct. 13-16, 1992, 15th National Computer Security Conference, https://csrc.nist.gov/publications/detail/conference-paper/1992/10/13/role-based-access-controls.*

Marfoq, "Throughput-Optimal Topology Design for Cross-Silo Federated Learning," Oct. 23, 2020, https://arxiv.org/abs/2010.12229.*

Mhaisen et al., "Optimal User-Edge Assignment in Hierarchical Federated Learning Based on Statistical Properties and Network Topology Constraints," Jan. 27, 2021, https://ieeexplore.ieee.org/abstract/document/9337204.*

"Server Topology", online: https://salt-formulas.readthedocs.io/projects/openstack-salt/en/latest/install/overview-server-topology.html, accessed Jan. 31, 2022, 3 pages.

"TensorFlow Operation Fusion", online: https://www.tensorflow.org/lite/convert/operation_fusion, accessed Feb. 15, 2022, 7 pages.

* cited by examiner

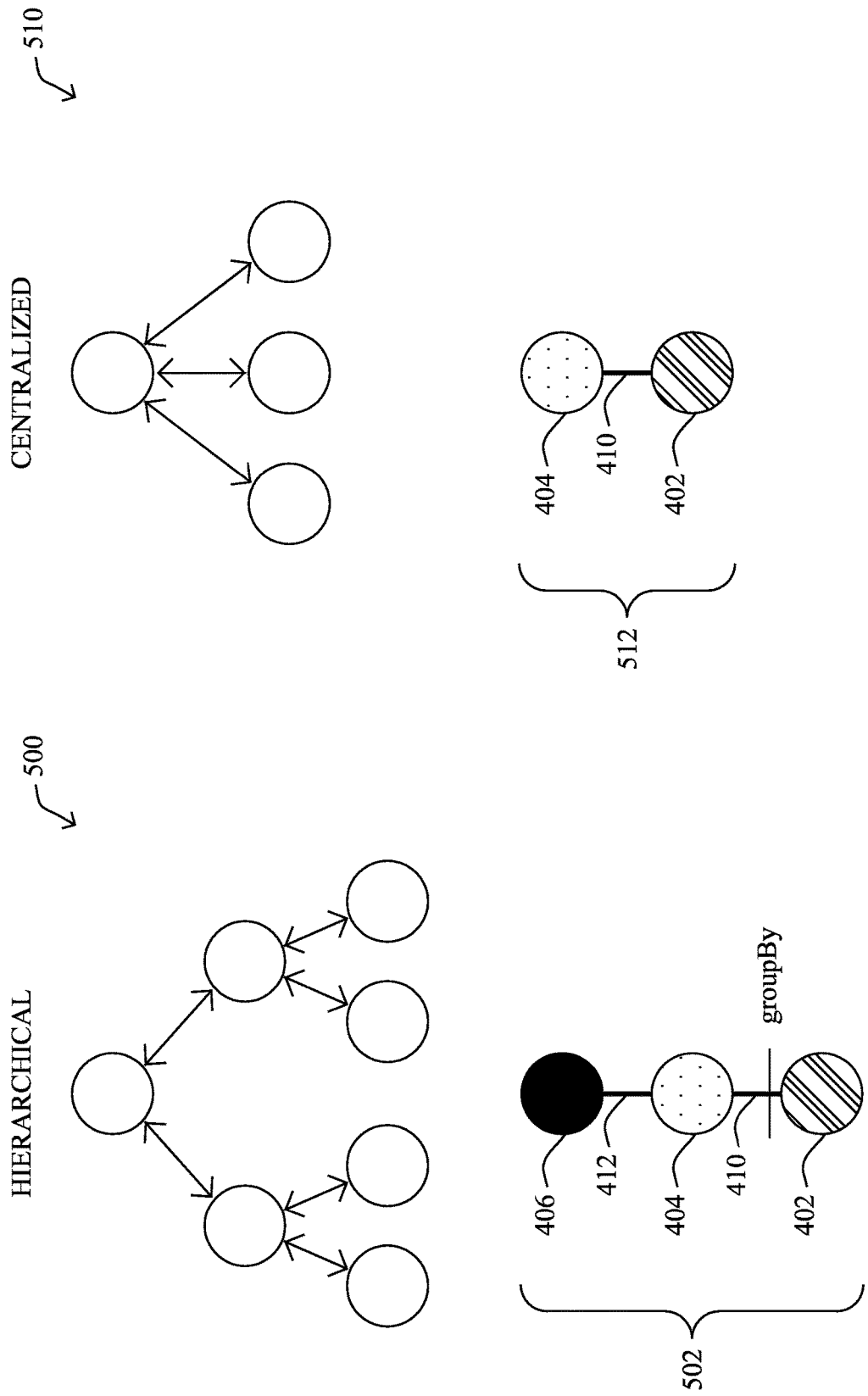

DYNAMIC TOPOLOGY RECONFIGURATION IN FEDERATED LEARNING SYSTEMS

TECHNICAL FIELD

The present disclosure relates generally to computer networks, and, more particularly, to dynamic topology reconfiguration in federated learning systems.

BACKGROUND

Machine learning is becoming increasingly ubiquitous in the field of computing. Indeed, machine learning is now used across a wide variety of use cases, from analyzing sensor data from sensor systems to performing future predictions for controlled systems.

Unfortunately, running a machine learning workload is a complex and cumbersome task, today. This is because expressing a machine learning workload is not only tightly coupled with infrastructure resource management, but also embedded into the machine learning library that supports the workload. Consequently, users responsible for machine learning workloads are often faced with time-consuming source code updates and error-prone configuration updates in an ad-hoc fashion for different types of machine learning workloads.

Indeed, as the needs of an application change, this may necessitate changes to the topology of the learning system and/or the algorithms used by its nodes. Typically, such changes have required extensive reworking of the code executed in the learning system, which can be an error-prone and cumbersome endeavor.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5D illustrate example topologies for a federated learning system.

DESCRIPTION OF EXAMPLE EMBODIMENTS

Overview

Figure 1A:
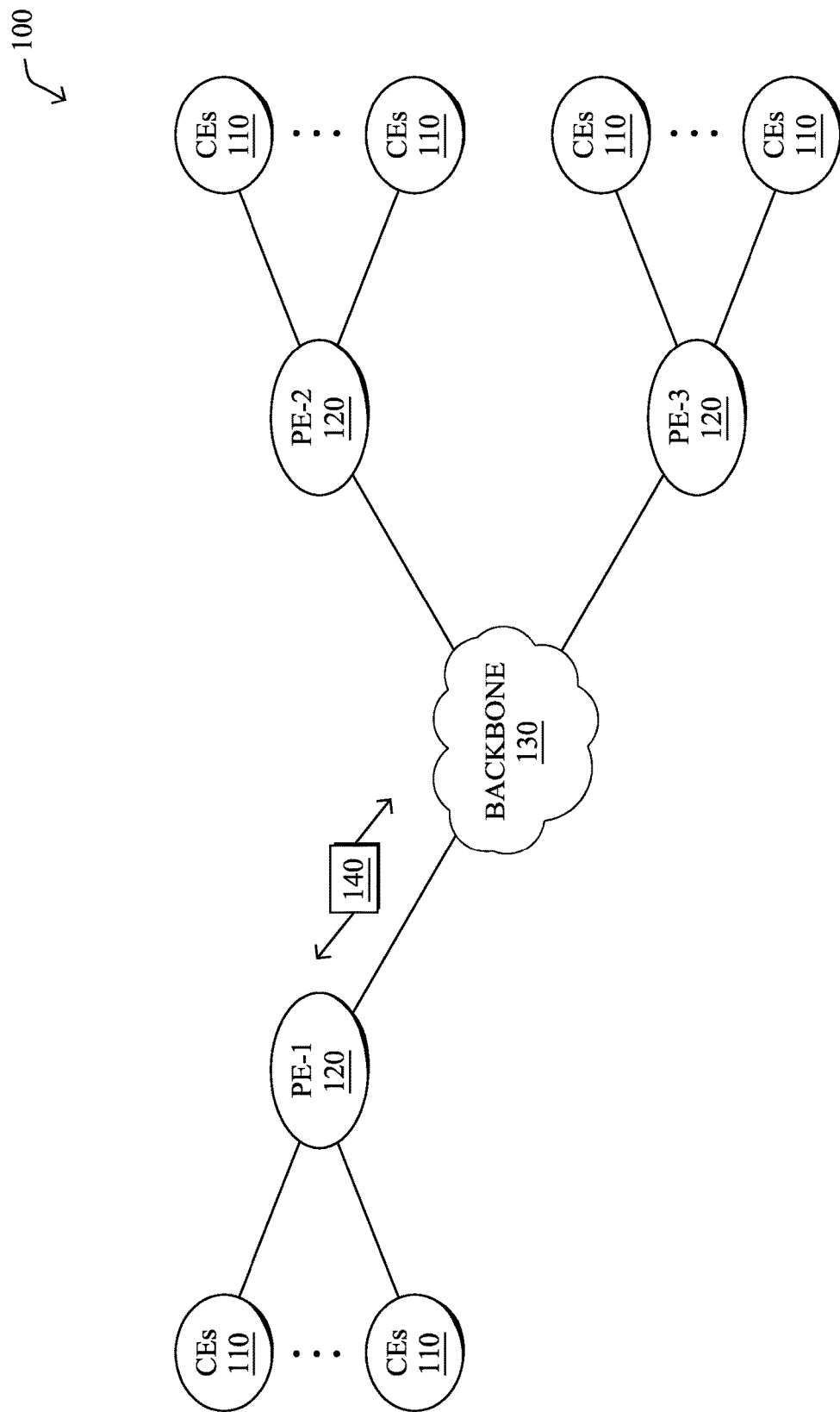
FIGS. 1A-1B illustrate an example communication network.

According to one or more embodiments of the disclosure, a device provides, to a user interface, data representing a topology of a federated learning system configured across nodes in a computer network. Each node in the topology has an assigned role and is connected to at least one other node via a connector that is dependent on its assigned role. The device receives, via the user interface, a requested change to the topology of the federated learning system. The device selects, based on assigned roles of those nodes affected by the requested change to the topology of the federated learning system, code for execution by those nodes. The device implements the requested change to the topology of the federated learning system in part by sending the code selected by the device to those nodes affected by the requested change.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
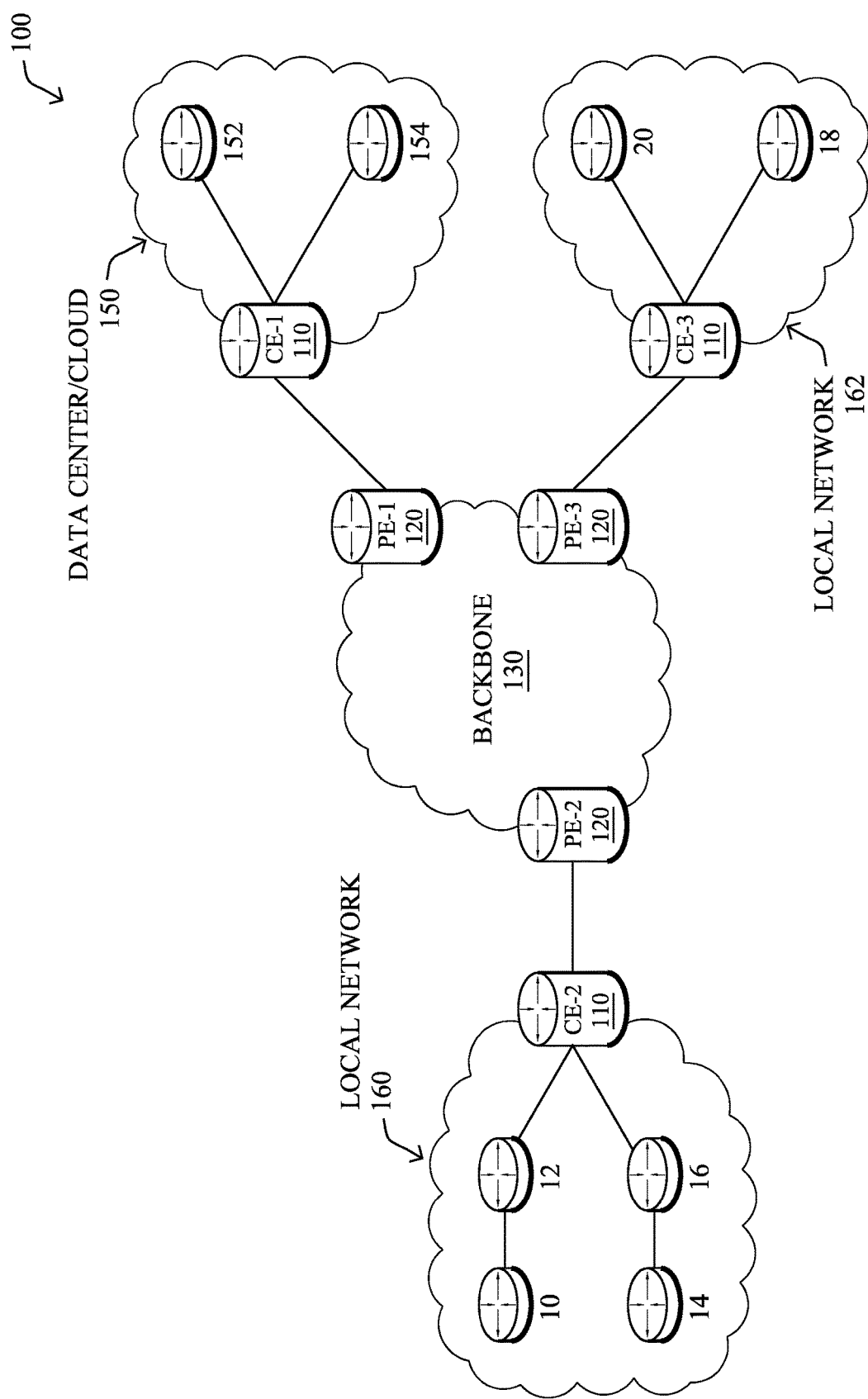

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
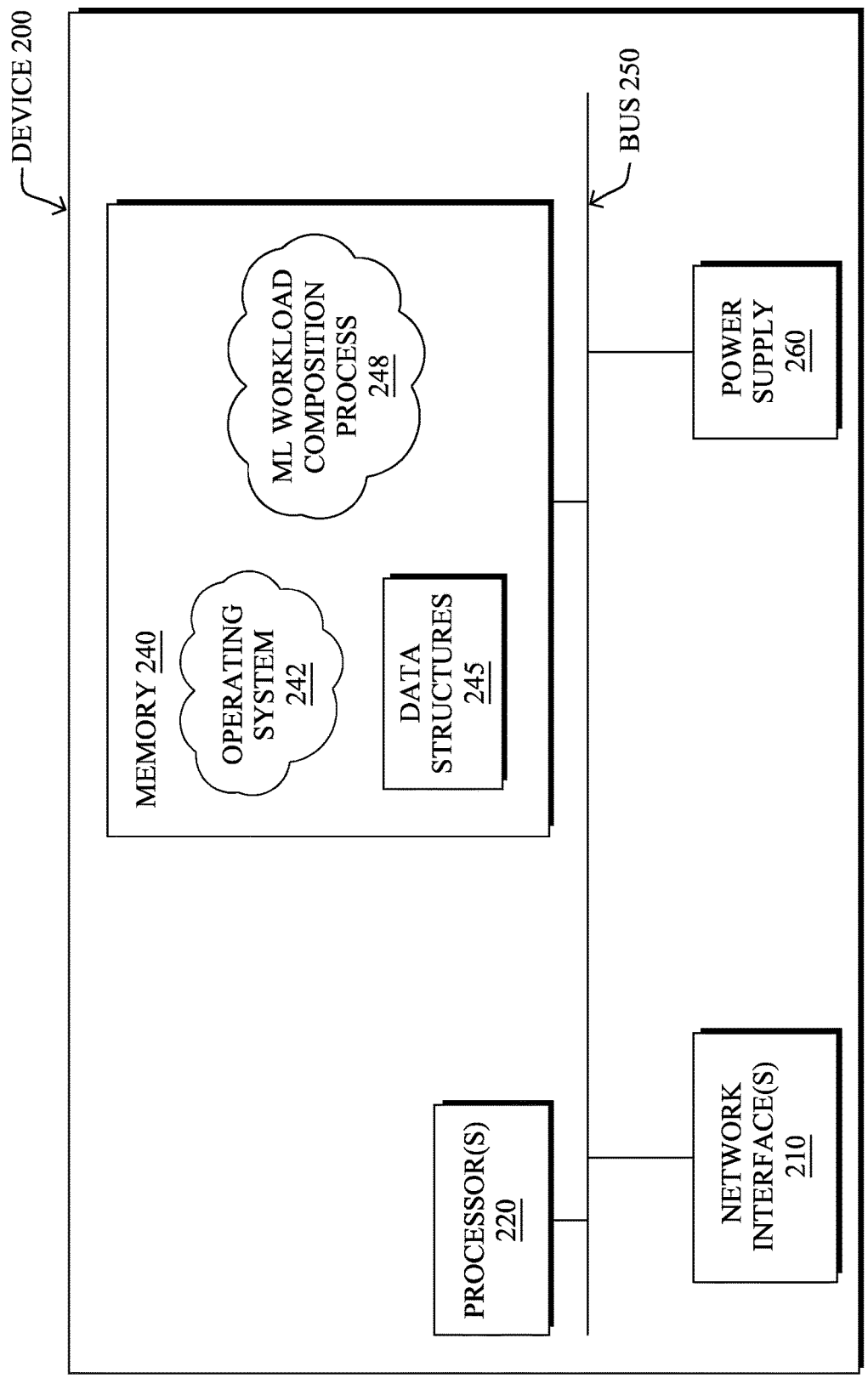
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a machine learning (ML) workload composition process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, ML workload composition process 248 may also include computer executable instructions that, when executed by processor(s) 220, cause device 200 to perform the techniques described herein. To do so, in some embodiments, ML workload composition process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, ML workload composition process 248 may employ, or be responsible for the deployment of, one or more supervised, unsupervised, or semi-supervised machine learning models. Generally, supervised learning entails the use of a training set of data, as noted above, that is used to train the model to apply labels to the input data. For example, the training data may include sample image data that has been labeled as depicting a particular condition or object. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that ML workload composition process 248 can employ, or be responsible for deploying, may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Unfortunately, running a machine learning workload is a complex and cumbersome task, today. This is because expressing a machine learning workload is not only tightly coupled with infrastructure resource management, but also embedded into the machine learning library that supports the workload. Consequently, users responsible for machine learning workloads are often faced with time-consuming source code updates and error-prone configuration updates in an ad-hoc fashion for different types of machine learning workloads.

Indeed, as the needs of an application change, this may necessitate changes to the topology of the learning system and/or the algorithms used by its nodes. Typically, such changes have required extensive reworking of the code executed in the learning system, which can be an error-prone and cumbersome endeavor. For instance, consider the case in which a federated learning system is established between several hospitals, each of which uses its own training data to train machine learning models that are then aggregated into a global model. To bring a new hospital online as part of the learning system may require topology changes for better scalability, which would require significant code changes to the learning system across both the new node(s) and the existing nodes.

Dynamic Topology Reconfiguration in Federated Learning Systems

The techniques introduced herein mitigate the complexity of planning, updating, and execution of a machine learning workload by engineers through the representation of machine learning workloads through a certain layer of abstraction. In some aspects, the techniques herein allow for the topologies of federated and/or other distributed learning systems to be updated on-the-fly, such as at the request of a user.

Illustratively, the techniques described herein may be performed by hardware, software, and/or firmware, such as in accordance with ML workload composition process 248, which may include computer executable instructions executed by the processor 220 (or independent processor of interfaces 210) to perform functions relating to the techniques described herein.

Specifically, according to various embodiments, a device provides, to a user interface, data representing a topology of a federated learning system configured across nodes in a computer network. Each node in the topology has an assigned role and is connected to at least one other node via a connector that is dependent on its assigned role. The device receives, via the user interface, a requested change to the topology of the federated learning system. The device selects, based on assigned roles of those nodes affected by the requested change to the topology of the federated learning system, code for execution by those nodes. The device implements the requested change to the topology of the federated learning system in part by sending the code selected by the device to those nodes affected by the requested change.

Operationally, as would be appreciated, a machine learning workload may be used to perform tasks such as aggregated model training, performing inferences on a certain dataset, or the like. However, defining a machine learning workload, especially across a distributed set of nodes/sites, can also be a very cumbersome and error-prone task.

According to various embodiments, the techniques herein propose decomposing machine learning workloads into primitives/building blocks and decoupling core building blocks (e.g., the AI/ML algorithm) of the workload from the infrastructure building blocks (e.g., network connectivity and communication topology). The infrastructure building blocks are abstracted so that the users can compose their workloads in a simple and declarative manner. In addition, scheduling the workloads is straightforward and foolproof, using the techniques herein.

In various embodiments, the techniques herein propose representing a machine learning workload using the following building block types:

Role—this is logical unit that defines behaviors of a component. Hence, role contains a software piece. Role allows an artificial intelligence (AI)/machine learning (ML) engineer to focus on behaviors of a component associated with a role. At runtime, a role may consist of one or more instances, but the engineer only needs to work on one role at a time during the workload design phase without the need to understand any runtime dependencies or constraints.

Channel—this is a logical unit that abstracts the lower-layer communication mechanisms. In some embodiments, a channel provides a set of application programming interfaces (APIs) that allow one role to communicate with another role. Some of key APIs are ends( ), broadcast( ), send( ), and recv( ). Function ends( ) returns a set of nodes attached to the other end of a given channel. With this function, a node on one side of the channel can choose other nodes at the other end of the channel and subsequently call send( ) and recv( ) to send or receive data with each node. A channel eliminates any source code changes, even when the underlying communication mechanisms change.

Roles and channels may also have various properties associated with them, to control the provisioning of a machine learning workload. In some embodiments, these properties may be categorized as predefined ones and extended ones. Predefined properties may be essential to support the provisioning and set by default, whereas extended properties may be user-defined. In other words, to enrich the functionality of the roles and channels, the user/engineer may opt to customize extended properties.

By way of example, a role may have either or both of the following predefined properties:

Replica—this property controls the number of role instances per channel. By default, this may be set to one, meaning there is one role instance per channel. However, a user may elect to set this property to a higher value, as desired.

Load Balance—this property provides the ability to load balance demands given to the role instances and to do fail-overs.

For a channel, there may be the following property:

Group By—this property accepts a list of values so that communication between roles in a channel are controlled by using the specified values. For example, this property can be used to control the communication boundary, such as allowing communications only in a specified geographic area in this property (e.g., U.S., Europe, etc.).

Using the above building blocks and properties, the system can greatly simplify the process for defining a machine learning workload for a user.

Figure 3:
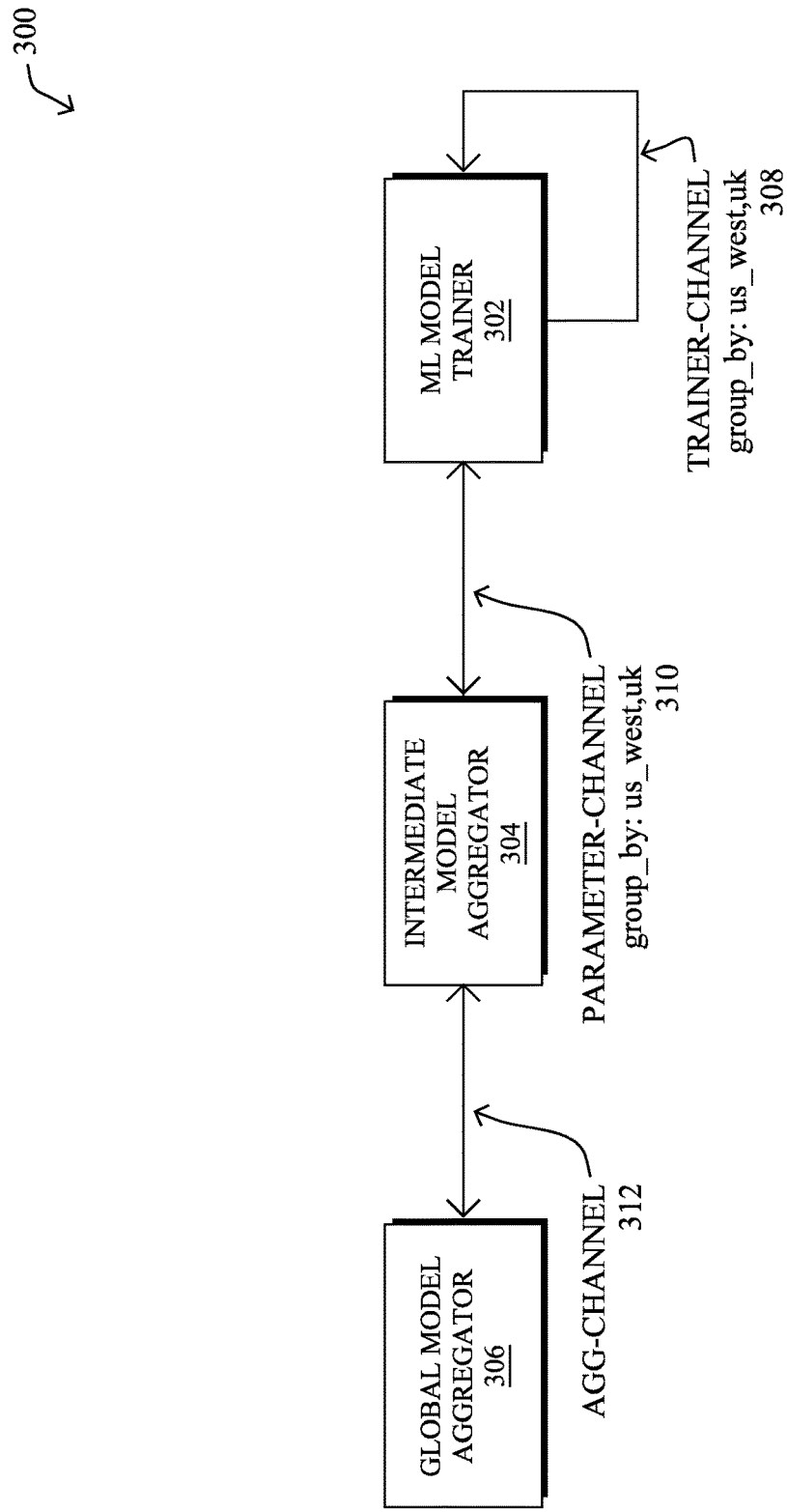
FIG. 3 illustrates an example role abstraction model for a machine learning workload.

FIG. 3 illustrates an example role abstraction model 300 for a machine learning workload, according to various embodiments. As shown, assume that a user wants to define a machine learning workload to train a machine learning model using data stored at different geographic locations. In a simple implementation, each site could simply transfer their respective datasets to a central location at which a model may be trained on that data. However, there are many instances in which the data is private, thereby preventing it from being sent off-site. For example, the datasets may include personally identifiable information (PII) data, medical data, financial data, or the like, that cannot leave their respective sites.

As shown, role abstraction model 300 consists of three roles for nodes of a federated/distributed learning system: machine learning (ML) model trainer 302, intermediate model aggregator 304, and global model aggregator 306. Connecting them in role abstraction model 300 may be three types of channels: trainer channel 308, parameter channel 310, and aggregation channel 312.

Trainer channels allows communication between peer trainer nodes at runtime. For instance, assume that the group by property is set to group trainer nodes into separate groups located in the western U.S. and the UK. In such a case, trainer channels may be provisioned between these nodes. Similarly, a parameter channel may enable communications between intermediate model aggregators, such as intermediate model aggregator 304 and trainer nodes in the various groups, such as model trainer 302. Finally, an aggregation channel may connect the intermediate model aggregator to global model aggregator 306.

Figure 4:
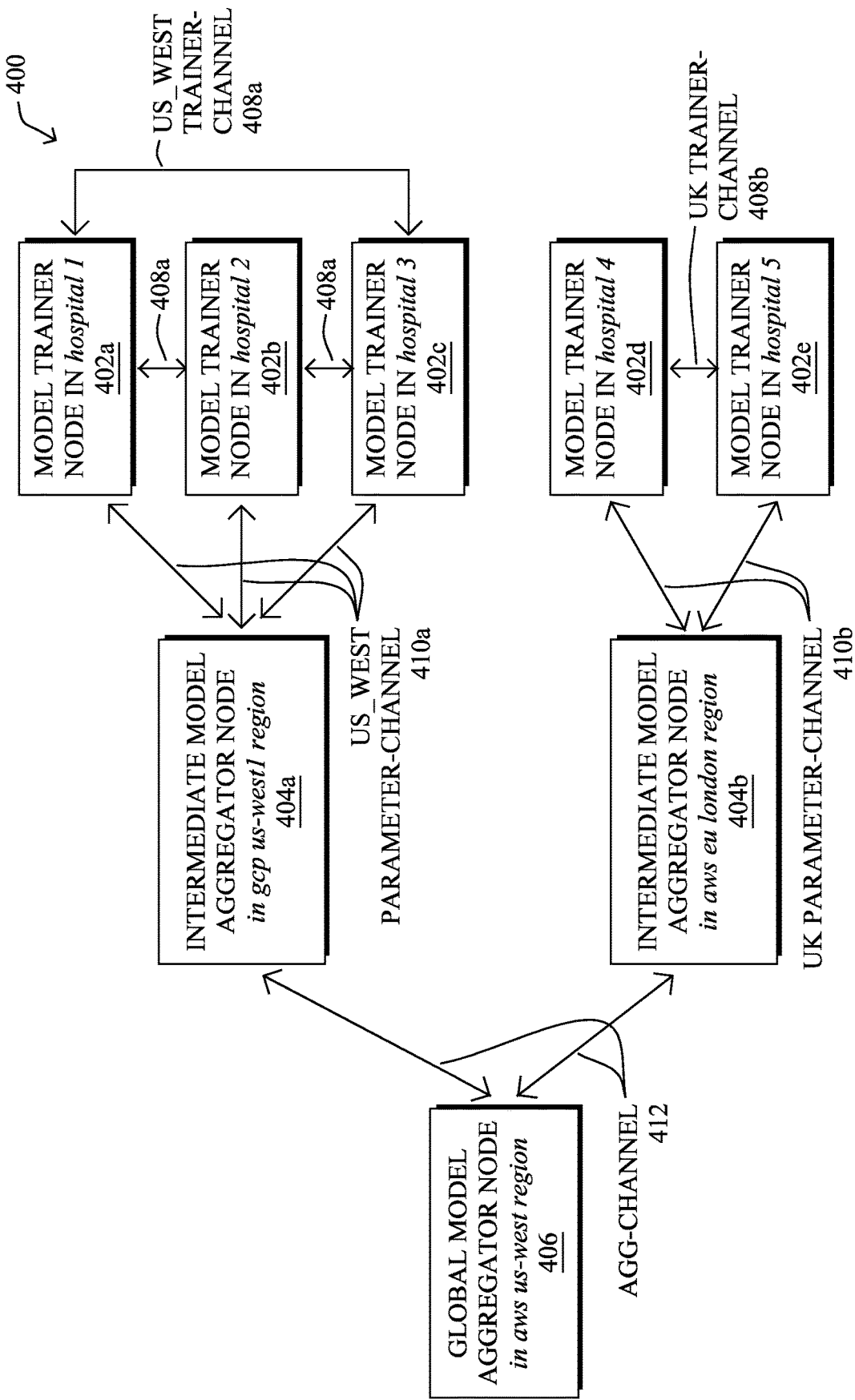
FIG. 4 illustrates an example of a machine learning workload defined in accordance with the role abstraction model of FIG. 3.

FIG. 4 illustrates an example of a machine learning workload 400 defined in accordance with role abstraction model 300 of FIG. 3, according to various embodiments. As shown, assume that the goal of the machine learning workload is to train a machine learning model to detect certain features (e.g., tumors, etc.) within a certain type of medical data (e.g., X-rays, MRI images, etc.). Such medical data may be stored at different hospitals or other locations across different geographic locations. For instance, assume that the medical data is spread across different hospitals located in the UK and the western US, each of which maintains its own training dataset.

To provision the machine learning workload across the different hospitals, a user may convey, via a user interface, definition data for the workload. For instance, the user may specify the type of model to be trained, values for the replica property, the number of datasets to use, tags for the group by property, any values for the load balancing property, combinations thereof, or the like.

Based on the definition data, the system may identify that the needed training datasets are located at nodes 402a-402e (e.g., the different hospitals). Note that the user does not need to know where the data is located during the design phase for machine learning workload 400, as the system may automatically identify nodes 402a-402e, automatically, using an index of their available data. In turn, the system may designate each of nodes 402a-402e as having training roles, meaning that each one is to train a machine learning model in accordance with the definition data and using its own local training dataset. In other words, once the system has identified nodes 402a-402e as each having training datasets matching the requisite type of data for the training, the system may provision and configure each of these nodes with a trainer role.

Assume now that the group by property has been set to group nodes 402a-402e by their geographic locations. Consequently, nodes 402a-402c may be grouped into a first group of trainer/training nodes, based on these hospitals all being located in the western US, by being tagged with a "us_west" tag. Similarly, nodes 402d-402e may be grouped into a second group of training nodes, based on these hospitals being located in the UK, by being tagged with a "uk tag.

For purposes of simplifying this example, also assume that the replica property is set to 1, by default, meaning that there is only one trainer role instance to be configured at each of nodes 402a-402e.

To connect the different sites/nodes 402a-402e in each group, the system may also provision and configure trainer channels between the nodes in each group. For instance, the system may configure trainer channels 408a between nodes 402a-402c within the first geographic group of nodes, as well as a trainer channel 408b between nodes 402d-402e in the second geographic group of nodes.

Once the system has identified nodes 402a-402e, it may also identify intermediate model aggregator nodes 404a-404b, to support the groups of nodes 402a-402c and 402d-402e, respectively. In turn, the system may configure model aggregator nodes 404a-404b with intermediate model aggregation roles. In addition, the system may configure parameter channels 410a-410b to connect the groups of nodes 402a-402c and 402d-402e with intermediate model aggregator nodes 404a-404b, respectively. These parameter channels 410a-410b, like their respective groups of nodes 402, may be tagged with the 'us_west' and 'uk' tags, respectively. In some instances, intermediate model aggregator nodes 404a-404b may be selected based on their distances or proximities to their assigned nodes among nodes 402a-402e. For instance, intermediate model aggregator node 404b may be cloud-based and selected based on it being in the same geographic region as nodes 402d-402e. Indeed, intermediate model aggregator node 404a may be provisioned in the Google cloud (gcp) in the western US, while intermediate model aggregator node 404b may be provisioned in the Amazon cloud (AWS) in the UK region.

During execution, each trainer node 402a-402e may train a machine learning model using its own local training dataset. In turn, nodes 402a-402e may send the parameters of these trained models to their respective intermediate model aggregator nodes 404a-404b via parameter channels 410a-410b. Using these parameters, each of intermediate model aggregator nodes 404a-404b may form an aggregate machine learning model. More specifically, intermediate model aggregator node 404a may aggregate the models trained by nodes 402a-402c into a first intermediate model and intermediate model aggregator node 404b may aggregate the models trained by nodes 402d-402e into a second aggregate model.

Finally, the system may also provision machine learning workload 400 in part by selecting and configuring global model aggregator node 406. Here, the system may configure a global aggregation role to global model aggregator node 406 and configure aggregation channels 412 that connect it to intermediate model aggregator nodes 404a-404b. Note that these aggregation channels may not be tagged with a geographic tag, either.

Once configured and provisioned, intermediate model aggregator nodes 404a-404b may send the parameters for their respective intermediate models to global model aggregator node 406 via aggregation channels 412. In turn, global model aggregator node 406 may use these model parameters to form a global, aggregated machine learning model that can then be distributed for execution. As a result of the provisioning by the system, the resulting global model will be based on the disparate training datasets across nodes 402a-402e, and in a way that greatly simplifies the definition process of the machine learning workload used to train the model.

As would be appreciated, the layout in which nodes are deployed and connected in a federated learning system is called a topology of the system. In general, the topology used to deploy a federated learning solution for an application depends on multiple factors such as data origin, regulatory requirements, resource/budget availability, combinations thereof, and the like.

In traditional systems (e.g., Tensorflow, etc.), developers typically build their own federated learning topologies from scratch using various primitives. However, with time as the application starts to grow and data source origin changes (e.g., increases or decreases) the deployed federated learning topology is also required to be updated. This often requires significant changes to the underlying system to implement such a topology change. In addition, once the changes have been implemented, the underlying system still needs to be tested before redeployment. Additionally, if a developer wishes to evaluate different algorithms to analyze the data, the entire process will need to be performed again, to redeploy the learning system.

According to various embodiments, the role abstraction model herein can be used to facilitate changes to the topology of a federated learning system in a simplified manner and/or update the learning algorithms used on the different nodes in the system (e.g., FedAvg, FedProxy, etc.). More specifically, since the role abstraction model abstracts the machine learning code from the topology deployment, the topology can be updated in a simplified manner without requiring the developer to make code changes, manually.

FIGS. 5A-5D illustrate example topologies for a federated learning system, according to various embodiments. Using the role abstraction model herein, a federated learning system can be reconfigured as desired to change between any of the topologies shown in FIGS. 5A-5D or any other form of topology that can be used for federated learning.

As shown, FIG. 5A illustrates an example hierarchical topology 500, in some embodiments. In general, nodes in a hierarchical federated learning system follow template 502 in which there are training nodes 402 at the lowest layer. Each of these nodes 402 is connected to an intermediate model aggregator node 404 via a parameter channel 410. Similarly, each intermediate model aggregator node 404 is connected to a global model aggregator node 406 via an aggregation channel 412.

In various embodiments, nodes 402-404 and/or channels 410-412 may be tagged using group tags. For instance, nodes may be tagged and grouped according to their capabilities/performance metrics (e.g., delay, load, etc.), geographic locations, or other characteristics. The system can use such group tags, for instance, for purposes of establishing channels 410-412, selecting an intermediate model aggregator node 404 (e.g., selecting a particular cloud to support a group of training nodes 402 in a particular location), or other such functions.

FIG. 5B illustrates an example centralized topology 510, in various embodiments. As shown in template 512, a simplified federated learning topology may entail simply utilizing a single model aggregation node to support all of the training nodes 402 in the learning system. More specifically, each training node 402 may be connected to an aggregation node 404 via a parameter channel 410, with that aggregation node 404 aggregating all models trained by training nodes 402. In this instance, the aggregation node 404 is no longer an 'intermediate' node, as it is the center/root of the entire centralized topology 510.

Figures 5C, 5D:
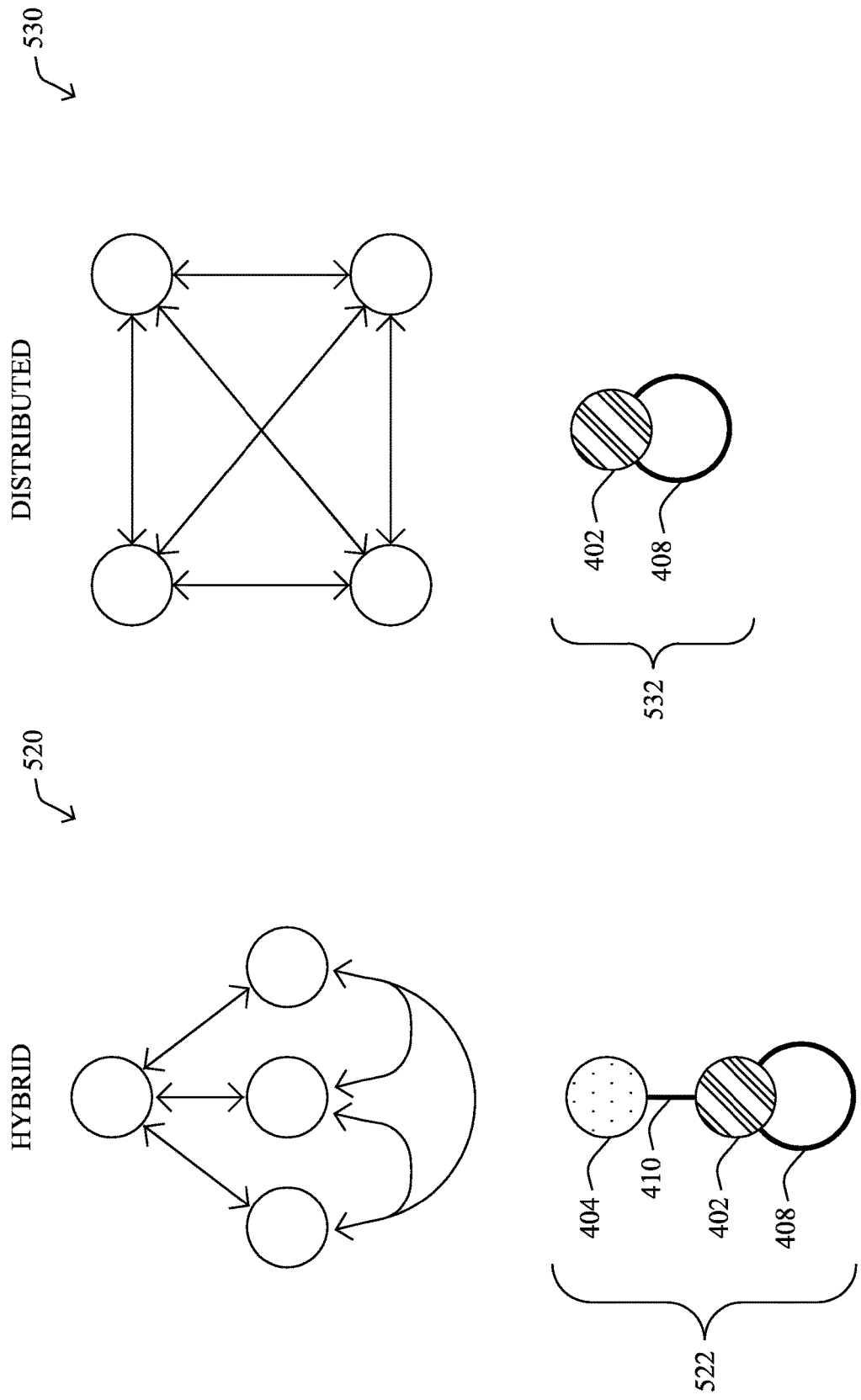

FIG. 5C illustrates an example hybrid topology 520, according to various embodiments. As shown by template 522, hybrid topology 520 may be similar in appearance and function as that of centralized topology 510 in FIG. 5B, with the additional use of trainer channels 408 between the training nodes 402. In other words, training nodes 402 may exchange information with one another, in addition to providing model data to a model aggregator node 404 via parameter channel 410.

As would be appreciated, a further refinement of hybrid topology 520 would be to add a global aggregation node 406 and additional aggregation nodes 404 as intermediate aggregation nodes, similar to that of hierarchical topology 500 in FIG. 5A. The resulting topology would then appear similar to that shown in FIG. 4. In addition, other topologies can also be defined such as by adding further aggregation layers, etc.

FIG. 5D illustrates a distributed topology 530, according to various embodiments. Unlike the previous topologies in FIGS. 5A-5C, a key feature of distributed topology 530 is that each node in it is assigned the role of a training node 402, as illustrated by template 532. Here, any or all of the training nodes 402 may be interconnected by trainer channels 408, allowing them to share data among one another and model parameters. Thus, at the end of training, all training nodes may have the same model without the need for involving any aggregator node.

Often, circumstances change over time that necessitate a change to the topology of the deployed federated learning system. For instance, the federated learning system may first be deployed using centralized topology 510 in FIG. 5B. However, as the application grows, it may become desirable to change the topology to hierarchical topology 500, as in FIG. 5A, which allows for the grouping/clustering of training nodes 402.

To initiate a change to the topology of a federated learning system, it is first assumed that a developer has defined the learning system in accordance with the role abstraction model herein. Using such a mechanism, a supervisory device (e.g., a device 200) may assign a role to each of the nodes (e.g., training node, intermediate model aggregation node, global aggregation node, etc.), as specified by the developer. In turn, the federated learning system may be deployed into the network by provisioning the relevant code at each of these nodes and configuring communication channels between those nodes, in accordance with the desired topology. The deployed code may, for instance, include the algorithms needed by the nodes to perform their assigned tasks, extract/aggregate the model updates, etc.

At some point in time, now assume that the developer wishes to change the topology of the federated learning system. To do so, the supervisory device overseeing the federated learning system may present data to a user interface that represents the current topology. For instance, such data may take the form of a graph or other graphical representation of the current topology of the federated learning system. Such graphical representations may also include indicia that distinguish between the different assigned roles of the nodes, information regarding the established communication channels between the nodes, group tag information assigned to the nodes and/or channels, information about the algorithms currently being executed by the nodes, or the like.

In turn, the developer may request a topology change to the federated learning system by interacting with the user interface. For instance, the user may manipulate a graphical user interface (GUI) on which the current topology of the federated learning system is displayed. Example actions supported by such a GUI may include, but are not limited to:

- Defining a new role—such an action may allow the developer to designate a new role to be included in the topology of the federated learning system, which allows for the addition of new nodes bound to the added role at deployment time.
- Deleting an existing role—here, the developer may request a topology change through the removal of a role from the federated learning system.
- Performing a group action—in cases in which nodes in the current topology are grouped according to their group tags, the developer may also request a topology change in part by changing how a group of nodes are to operate (e.g., by reporting to a new aggregation node, etc.).
- Migrating from one topology type to another—in some instances, the GUI may also include an option that allows the developer to migrate from one type of topology to another. For instance, the GUI may include an automated option to convert the topology of the federated learning system from a centralized topology to a hierarchical, hybrid, distributed, or other type of topology.

Other actions supported by the GUI may include, for instance, requesting changes to the training data, which may result in nodes being added or deleted (e.g., adding training data from a new hospital joining the system, etc.), the algorithms used (e.g., to use a different training methodology, etc.), or the like.

In response to receiving the requested change, the supervisory device may select code for execution by those nodes affected by the requested change, in various embodiments. For instance, in the case of adding a node to the current topology, the supervisory device may select code for execution by the node according to its assigned role. In another example, the selected code may cause the affected node to form a communication channel with one or more other nodes in the federated learning system. In another embodiment, the selected code may take the form of a different algorithm to be used by the affected nodes.

Finally, the supervisory device may implement the requested change to the topology of the federated learning system in part by sending the code selected by the device to those nodes affected by the requested change, in various embodiments. By way of example, consider a topology change that entails moving from centralized topology 510 to hierarchical topology 500, as shown in FIGS. 5A-5B. In such a case, the supervisory device may provision a global model aggregator node 406 by sending the relevant aggregation code to that node in the network. Similarly, the supervisory device may send code to an intermediate model aggregator node 404 that causes it to establish an aggregation channel 412 over which it sends its model data to the global model aggregator node 406. In more complex scenarios, the code changes can also create different groupings of nodes in the new hierarchical topology 500, such as by instantiating a new intermediate model aggregator node 404, and corresponding communication channels 410-412, to which a certain group of training nodes 402 are to send their model data for aggregation.

Figure 6:
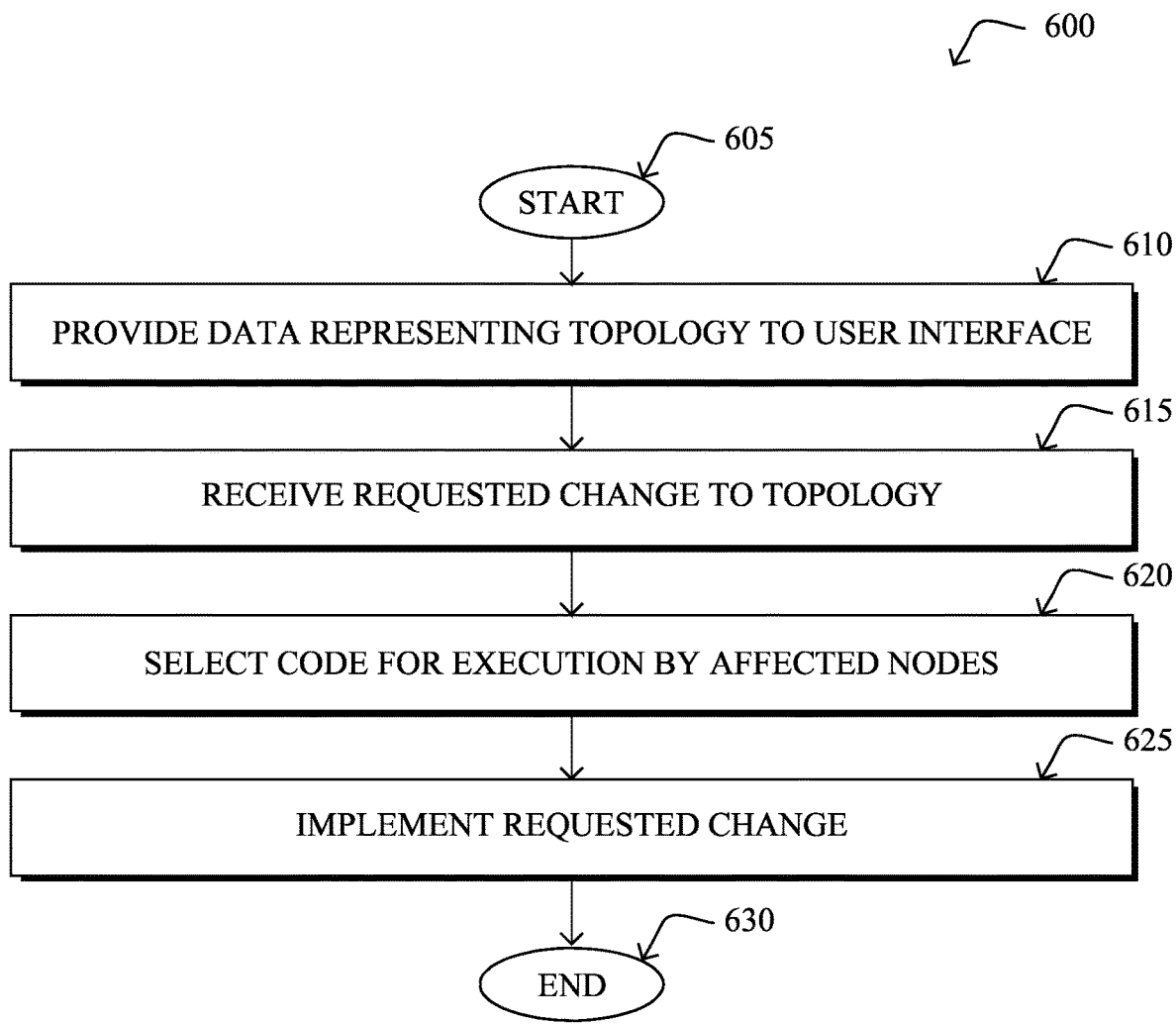
FIG. 6 illustrates an example simplified procedure for dynamic topology reconfiguration in federated learning systems.

FIG. 6 illustrates an example simplified procedure 600 (e.g., a method) for dynamic topology reconfiguration in federated learning systems, in accordance with one or more embodiments described herein. For example, a non-generic, specifically configured device (e.g., device 200), may perform procedure 600 by executing stored instructions (e.g., ML workload composition process 248). The procedure 600 may start at step 605, and continues to step 610, where, as described in greater detail above, the device may provide, to a user interface, data representing a topology of a federated learning system configured across nodes in a computer network. In various embodiments, each node in the topology has an assigned role and is connected to at least one other node via a connector that is dependent on its assigned role. In one embodiment, the data representing the topology of the federated learning system further comprises group tags assigned to the nodes in the topology according to their delay, load, or geographic location. In yet another embodiment, the data representing the topology of the federated learning system further comprises group tags assigned to the nodes in the topology according to their delay, load, or geographic location. For instance, the data may indicate that the federated learning system includes three different groups of trainer nodes: a first group located in the United States, a second group located in the United Kingdom, and a third group located in Asia.

At step 615, as detailed above, the device may receive, via the user interface, a requested change to the topology of the federated learning system. In one embodiment, the topology of the federated learning system is a centralized topology. In another embodiment, the requested change to the topology of the federated learning system comprises changing the assigned role of a node in the topology of the federated learning system.

At step 620, the device may select, based on assigned roles of those nodes affected by the requested change to the topology of the federated learning system, code for execution by those nodes, as described in greater detail above. In some embodiments, assigned roles of the nodes comprise one or more of: a training role, an intermediate aggregation role, or a global aggregation role. In one embodiment, the requested change to the topology of the federated learning system comprises changing the topology of the federated learning system to a hierarchical topology. In another embodiment, the requested change to the topology of the federated learning system comprises changing the topology of the federated learning system to a distributed topology. In a further embodiment, the requested change to the topology of the federated learning system comprises changing the topology of the federated learning system to a centralized topology. In yet another embodiment, the requested change to the topology of the federated learning system comprises changing the topology of the federated learning system to a hybrid topology.

At step 625, as detailed above, the device may implement the requested change to the topology of the federated learning system in part by sending the code selected by the device to those nodes affected by the requested change. In one embodiment, the device may do so by configuring a communication channel between two or more of the nodes affected by the requested change. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for adjustments to be made to a topology of a federated learning system in a "one click" manner. More specifically, the techniques herein provide for additional flexibility of on-the-fly selection and updating of learning algorithms on different nodes involved in the system.

While there have been shown and described illustrative embodiments that provide for dynamic topology reconfiguration in federated learning systems, it is to be understood that various other adaptations and modifications may be made within the spirit and scope of the embodiments herein. For example, while certain embodiments are described herein with respect to machine learning workloads directed towards model training, the techniques herein are not limited as such and may be used for other types of machine learning tasks, such as making inferences or predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
providing, by a device and to a user interface, data representing a topology of a federated learning system configured across nodes in a computer network, wherein each node in the topology has an assigned role and is connected to at least one other node via a connector that is dependent on its assigned role;
receiving, at the device and via the user interface, a requested change to the topology of the federated learning system;
determining, by the device and based on assigned roles of those nodes affected by the requested change to the topology of the federated learning system, role-specific code for execution by each of those nodes to operate according to the requested change; and
implementing, by the device, the requested change to the topology of the federated learning system in part by sending the role-specific code determined by the device to those nodes affected by the requested change to cause those nodes to operate according to the requested change.

2. The method as in claim 1, wherein assigned roles of the nodes comprise one or more of: a training role, an intermediate aggregation role, or a global aggregation role.

3. The method as in claim 1, wherein the topology of the federated learning system is a centralized topology.

4. The method as in claim 1, wherein the requested change to the topology of the federated learning system comprises changing the assigned role of a node in the topology of the federated learning system.

5. The method as in claim 1 wherein implementing the requested change to the topology of the federated learning system comprises:
configuring a communication channel between two or more of the nodes affected by the requested change.

6. The method as in claim 1, wherein the data representing the topology of the federated learning system further comprises group tags assigned to the nodes in the topology according to their delay, load, or geographic location.

7. The method as in claim 1, wherein the requested change to the topology of the federated learning system comprises changing the topology of the federated learning system to a hierarchical topology.

8. The method as in claim 1, wherein the requested change to the topology of the federated learning system comprises changing the topology of the federated learning system to a distributed topology.

9. The method as in claim 1, wherein the requested change to the topology of the federated learning system comprises changing the topology of the federated learning system to a centralized topology.

10. The method as in claim 1, wherein the requested change to the topology of the federated learning system comprises changing the topology of the federated learning system to a hybrid topology.

11. An apparatus, comprising:
one or more network interfaces;
a processor coupled to the one or more network interfaces and configured to execute one or more processes; and
a memory configured to store a process that is executable by the processor, the process when executed configured to:
provide, to a user interface, data representing a topology of a federated learning system configured across nodes in a computer network, wherein each node in the topology has an assigned role and is connected to at least one other node via a connector that is dependent on its assigned role;
receive, via the user interface, a requested change to the topology of the federated learning system;
determine, based on assigned roles of those nodes affected by the requested change to the topology of the federated learning system, role-specific code for execution by each of those nodes to operate according to the requested change; and
implement the requested change to the topology of the federated learning system in part by sending the role-specific code to those nodes affected by the requested change to cause those nodes to operate according to the requested change.

12. The apparatus as in claim 11, wherein assigned roles of the nodes comprise one or more of: a training role, an intermediate aggregation role, or a global aggregation role.

13. The apparatus as in claim 11, wherein the requested change to the topology of the federated learning system comprises changing the assigned role of a node in the topology of the federated learning system.

14. The apparatus as in claim 11, wherein the apparatus implements the requested change to the topology of the federated learning system by:
configuring a communication channel between two or more of the nodes affected by the requested change.

15. The apparatus as in claim 11, wherein the data representing the topology of the federated learning system further comprises group tags assigned to the nodes in the topology according to their delay, load, or geographic location.

16. The apparatus as in claim 11, wherein the requested change to the topology of the federated learning system comprises changing the topology of the federated learning system to a hierarchical topology.

17. The apparatus as in claim 11, wherein the requested change to the topology of the federated learning system comprises changing the topology of the federated learning system to a distributed topology.

18. The apparatus as in claim 11, wherein the requested change to the topology of the federated learning system comprises changing the topology of the federated learning system to a centralized topology.

19. The apparatus as in claim 11, wherein the requested change to the topology of the federated learning system comprises changing the topology of the federated learning system to a hybrid topology.

20. A tangible, non-transitory, computer-readable medium storing program instructions that cause a device to execute a process comprising:
providing, by the device and to a user interface, data representing a topology of a federated learning system configured across nodes in a computer network, wherein each node in the topology has an assigned role and is connected to at least one other node via a connector that is dependent on its assigned role;
receiving, at the device and via the user interface, a requested change to the topology of the federated learning system;
determining, by the device and based on assigned roles of those nodes affected by the requested change to the topology of the federated learning system, role-specific code for execution by each of those nodes to operate according to the requested change; and
implementing, by the device, the requested change to the topology of the federated learning system in part by sending the role-specific code determined by the device to those nodes affected by the requested change to cause those nodes to operate according to the requested change.

* * * * *